United States Patent [19]

Blue et al.

[11] Patent Number: 4,961,175
[45] Date of Patent: Oct. 2, 1990

[54] LOW FREQUENCY SOUND SOURCE FOR ACOUSTIC SWEEPS

[75] Inventors: Joseph E. Blue; Thomas C. Watson, both of Panama City, Fla.

[73] Assignee: The United States of America as represented by the Secretary of the Navy, Washington, D.C.

[21] Appl. No.: 690,718

[22] Filed: Dec. 12, 1967

[51] Int. Cl.⁵ .............................................. G01V 1/02
[52] U.S. Cl. .................................... 367/142; 367/144
[58] Field of Search ................... 181/0.5 A, 0.5 C, 0.5, 181/115, 117, 118; 340/5 D, 12, 8; 114/235, 235.2, 253; 367/142, 144

[56] References Cited

U.S. PATENT DOCUMENTS

| | | | |
|---|---|---|---|
| 3,219,970 | 11/1965 | Sims | 367/176 |
| 3,246,286 | 4/1966 | Barry | 367/142 |
| 3,286,226 | 11/1966 | Kearsley et al. | 367/147 |

Primary Examiner—Thomas H. Tarcza
Assistant Examiner—Daniel T. Pihulic
Attorney, Agent, or Firm—Harvey David; John Becker; Sol Sheinbein

[57] ABSTRACT

An underwater acoustic generator comprising a tapered solid positioned in a fluid flow to produce a cavitation void. A source of gas supplies the void with gas to produce a resonant gas bubble.

11 Claims, 3 Drawing Sheets

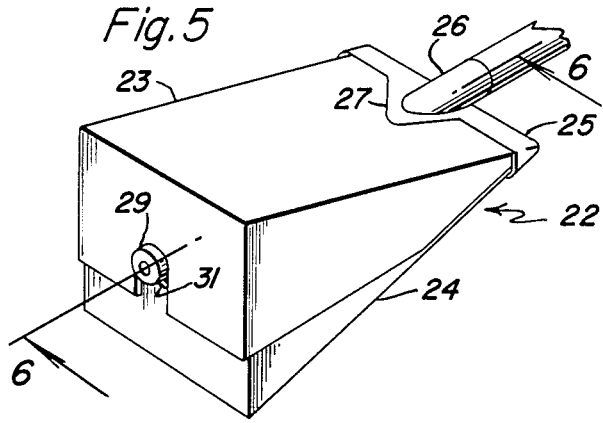
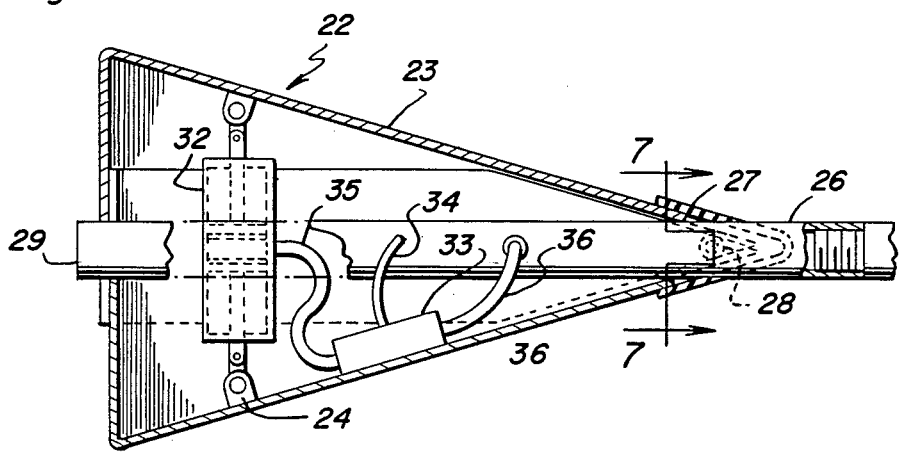
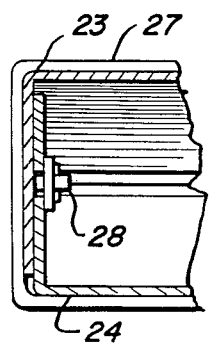

LOW FREQUENCY SOUND SOURCE FOR ACOUSTIC SWEEPS

The subject matter of the present invention pertains to an underwater acoustic generator which is particularly suitable for use in a countermeasure system for acoustically activated marine mines. It is known, in the prior art, to sweep such mines with acoustic generators that produce an audio output over a particular frequency band. The generator of this invention differs from prior art devices in both construction and principal of acoustic generation; these differences make the generator of the invention particularly suitable for mine sweeping even, in one form, from small inland watercraft.

The acoustic energy output of the generator of this invention emanates from an oscillating gas bubble. The bubble occupies the cavitation void at the aft of a shaped solid which is towed or otherwise subjected to a flow of liquid to produce the bubble. The bubble is supplied by a flow of gas from a conduit to replenish gas lost to the fluid. While bubbles or other gas pockets have been used in the past as acoustic sources in fluid mediums, they heretofore were transitory or pulsed, as in the case of a bubble of explosive gases that is ignited to produce an audio burst. Encased or captured gas pockets have been used as impedance matching devices and radiating surfaces for other generators but require additional associated acoustic drivers to produce the acoustic energy. Such devices of the prior art are bulky and require extensive auxiliary equipment limiting their utility.

The present invention overcomes these and many other liminations of the devices of the prior art in producing a high output acoustic signal in the lower portion of the sudio range with a minimum of electrical or mechanical complexity, thereby enhancing its utility in highly mobile applications.

It is, therefore, an object of this invention to provide an acoustic generator which has an output in the low frequency portion of the audio range which does not require bulky auxiliary equipment.

It is a further object of this invention to provide an audio generating system for use as a countermeasure against acoustically activated marine mines.

It is a further object of this invention to provide a submarine, acoustic generator which may be turned over a range of frequencies from a towing tractor vehicle.

It is a further object of this invention to provide a submersed acoustical generator utilizing a free, resonant, cavitation-positioned bubble as a sound generating radiator.

It is an additional object of the present invention to provide an acoustic generator capable of generating an audio signal for the purpose of detonating and thereby neutralizing acoustical type marine mines.

A more specific object of the present invention is the provision of an acoustic generator which is adapted for use from small inland watercraft or light aircraft which will effectively detonate concealed acoustic type mines.

It is a further object of this invention to provide a submersed acoustic generator for use as a countermeasure for acoustically activated marine mines which may be used from a stationary position.

Other objects and many of the attendant advantages will be readily appreciated as the subject invention becomes better understood by reference to the following detailed description, when considered in conjunction with the accompanying drawings wherein:

FIGS. 5 through 7 illustrate a modified form of the acoustic generator according to the invention.

The motion through a liquid medium of solid bodies is opposed by various forces and in particular at certain velocities by a phenomenon known as cavitation. This is manifested as a void or vacuum, familiar to persons experienced in the use and design of hydrofoils and marine propulsion screws, formed of the aft sides of the aforesaid solids. The size and shape of this void or vacuum space is dependent upon the configuration of the solid object and the relative velocity of the solid and the liquid medium. It has been discovered that if this vacuum is supplied with a gas, such as air, for example, an entrapped bubble will be formed which will resonant to radiate acoustic energy in the audio frequency range. While some gas escapes from this bubble, a modest flow will suffice to keep the bubble supplied.

Figure 1:
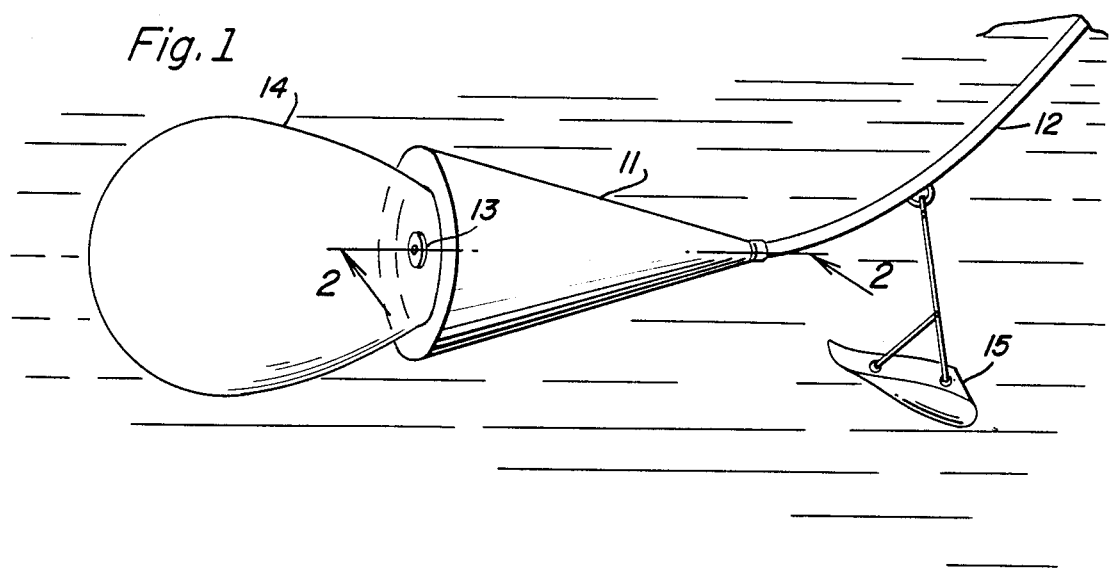
FIGS. 1 through 3 illustrate a basic form of an acoustic generator according to the invention.
Figure 2:
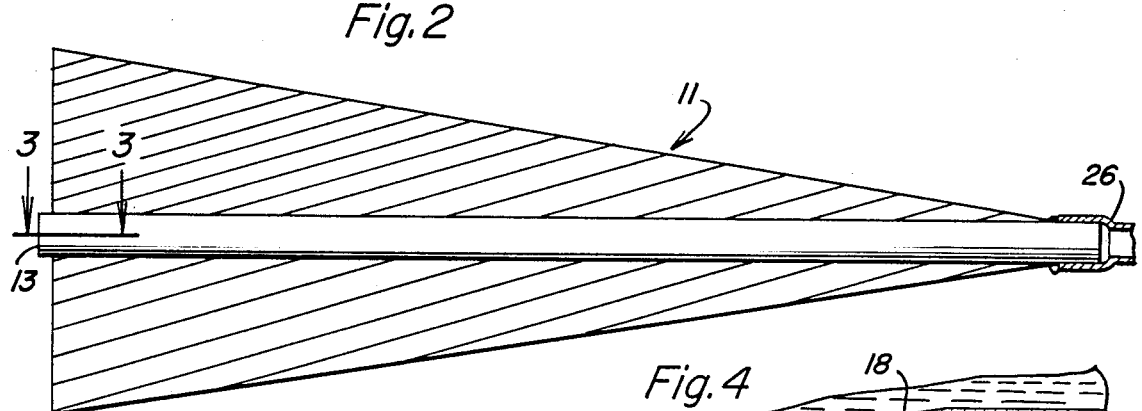
Figure 3:
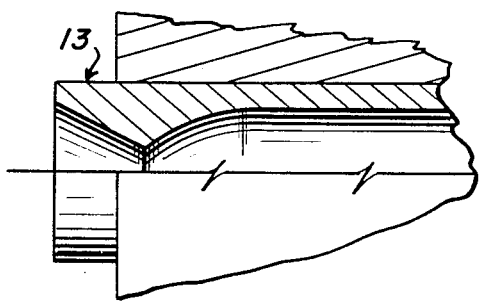

A more complete understanding of how the aforementioned properties are employed in our invention is obtained by referring to the illustration of one embodiment as shown in FIG. 1. A conical body 11 is towed beneath the surface of a body of water, with its apex foremost, by means of a connecting conduit 12. As shown in FIG. 2, conduit 12 is terminated by a nozzle 13 which penetrates the length of, and terminates at the aftmost surface of conical body 11 and supplies gas to a cavitation void created by said towing action. By reason of internal construction the nozzle 13 and the pressure of the gas source, not shown, the proper amount of gas is supplied the void to sustain a self resonant bubble 14. The construction of the nozzle is not critical, and a simple shaped constriction (see FIG. 3) is generally satisfactory. Inasmuch as the particular nozzle construction is neither critical nor necessary to the understanding of the invention, a detailed description is not included herein. The operational efficiency of the device is enhanced by keeping the generator near the bottom of the body of water where the acoustic image is positive or reinforcing. This placement of the acoustic generator is accomplished by means of a conventional depression device 15.

In operation the flow of water across the surface of the conical body 11, occasioned by the towing of conical body 11 through the water by conduit 12, causes a void to be formed. Air or other suitable gas is supplied to the void by nozzle 13 via conduit 12 to form the bubble 14. It has been found that the source of gas pressure is not critical. A low powered compressor, a bottle of gas, and even, simply a conduit opened to the atmosphere have proven effective in some circumstances. Under towed conditions the bubble exhibits a self sustained oscillation in the lower audio range.

The device of FIG. 1 is particularly suited, by reason of its simplicity, to be towed by small surface vessels or light aircraft. As explained herein, the frequency of the audio output may be varied somewhat by altering the dimensions of the device, the flow of gas supplied the cavity, and the towing speed. Thus for a given towing speed, a shape may be devised to produce the desired frequency range within the towing capabilities of the particular tractor vehicle. Thus, a commander of smallcraft by selecting a particular generator to match the towing conditions can produce a countermeasure acoustic signal in a desired frequency range.

The generator body 11 may be constructed of flexible material, suitably weighted, such that it is held in its operational configuration, as illustrated by the presence of the gas delivered it by conduit 12. In this instance nozzle 13 will be designed to limit the flow of gas to bubble 14. Such a construction permits compact storage of a large number of generator bodies in a relatively small space.

In order to understand the operation of the device more thoroughly, and to better appreciate the engineering parameters of the more complex forms of the invention, one must consider the acoustic properties of the gas pocket or bubble resonantor. In considerring such bubbles the approximate or center resonant frequency of the gas bubble is given by $$f = \frac{660}{d} \sqrt{\frac{h}{33}}$$

where
  f is the resonant frequency in cps,
  d is the diameter of the bubble in cm, and
  h is the depth of the bubble from the water surface infeet.

The foregoing expression assumes the bubble is spherical, the surface tension of the bubble is negligible, and the numerical constants carry suitable units to make the equation valid.

From the foregoing, one sees that the frequency may be controlled by varying the flow rate of the water, or both fluid, and the pressure of the gas supplied to cause the shape and volume of the bubble to change accordingly.

Figure 4:
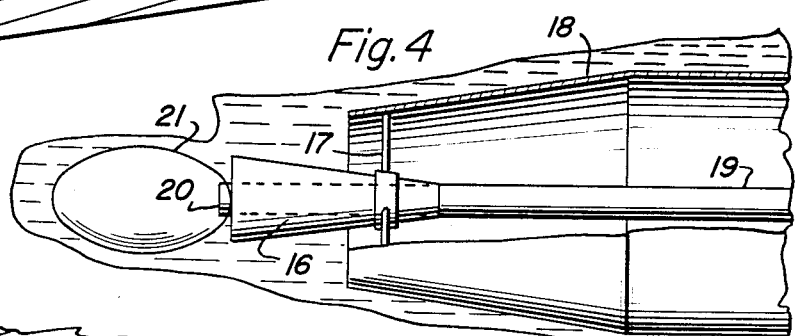
FIG. 4 illustrates an acoustic generator according to the invention which is suitable for use from a fixed position.

FIG. 4 illustrates, in quarter section, an embodiment of the invention particularly adapted to permit the aforementioned tuning variations. A conical body 16 is centered, base outermost, by means of suitable support means 17, in a large fluid carrying conduit 18, and is penetrated, apex-to-base, by a smaller gas carrying conduit 19. Conduit 19 terminates in a constriction type nozzle 20. Water, or other liquid in which the generator is submerged, is forced between conduits 18 and 19 by means of a suitable pumping apparatus, not shown. The exact rate of flow from said pumping apparatus may be regulated by a suitable conventional variable orfice valve means, if desired. A cavitation void is produced by the water flow contiguous to the outermost base portion of conical body 16. The aforesaid cavitation void is supplied a gas by means of nozzle 20, resulting in the formation of resonant bubble 21.

While the construction of FIG. 4 is functionally adequate, there exists limitations which limit operational units to larger craft. Principally, the requirement of a pump capable of delivering a fluid flow of the required rate, approximately fifty feet per second, over an area suitable for a conical body, of a size sufficient to generate a bubble of useful dimensions, usually precludes the device being employed in small inland water craft or light aircraft.

The regulation of the air pressure to effect the above mentioned variations of bubble size is accomplished without difficulty by means of a suitable valve arrangement. The regulation of the water flow rate is more difficult to accomplish. In the instance of FIG. 1, the only way to increase or decrease the flow rate is to make a corresponding change in the towing speed. When the required flow rate is beyond the capabilities of the towing tractor vehicle, the shape of the conical body must be altered to obtain the desired flow rate. Rather than retrieve the generator from the towed position and replace it with another of a different shape, the species of generator of the invention shown in FIGS. 5 through 7 may be used.

Referring to FIG. 5, a wedge shaped generator 22 is shown as comprising an interfitting top portion 23 and bottom portion 24. The wedge body portions are hinged at their forward common edge 25 so as to permit the top portion 23 and bottom portion 24 to assume different angularly related positions with respect to each other. The hinge, shown at 28 in FIGS. 6 and 7, is protected against water borne debris by a flexible covering 27. A flexible conduit 26 tows the wedge bodied generator 22 from its forward hinged edge 25 and passes through the wedge to terminate in a nozzle 29 producing through the aft end of the wedge body. Suitable cut out portions 31 of top portion 23 and bottom portion 24 permit the two to move relative to each other, as noted above, without interference from nozzle 29. The aft end portions may be made with sufficient clearance to permit the relative positioning of top portion 23 and bottom portion 24; they may be flexible enough to permit such positioning; or hinged, as the top and bottom portions 23 and 24, if desired. Flexible conduit 26 may also contain two electrical conductors, not shown, these may be carried separately or may constitute reinforcing for the conduit.

As shown in FIG. 6, which is a sectional view of FIG. 5 taken along line 6—6 and parallel to the side of the wedge, an expansible chamber motor 32 is mounted to angularly position top portion 23 and bottom portion 24. A suitable electrically controlled valve mechanism 33 is conducted to the conduit carried conductors by electrical wiring 34 and to the expansible chamber motor 32 by flexible tubing 35 and to the conduit 26 by flexible tubing 36.

The electrically controlled valve 33 has three positions of operation. One position connects the expansible chamber motor 32 to the gas flow from conduit 26 to fill, or expand, the chamber; another porition exhausts, or collapses, the motor chamber; and the third seals the motor chamber to immobilize the motor. These positions may be sequentially obtained, one for each actuating in one type valve, or selectively actuated in response to the polarity or absence of a control signal in another type valve. The valve itself may be any one of many of these two well known types of valves, and since the specific operation is not critical to the understanding of the device, the particular manner in which the valve functions is not shown.

The motor could, if desired, be an electrical motor controlled by the two conductor circuit. The expansible chamber type motor has the desirable property of being self locking when sealed and, accordingly, requires no separate breaking mechanism. Further, valve 33 is less of an electrical load than an electrical motor of adequate power and believed preferable in most applications.

It is obvious, to one skilled in hydrodynamics, that the resonant bubble produced by the device of FIGS. 5 through 7 is not radially symmetrical about the axis of nozzle 29. Such an asymmetry is not detrimental to the operation of the device in the low frequency range contemplated because the size of the bubble is quite small compared to the wavelength of the acoustic energy produced by the bubble.

Each of the forms of the adjustable acoustic generator function is the same fashion as the type of generator shown in FIG. 1. Each type has its own advantages making it more suitable for specific applications than the other two. The generator of FIG. 4 is more adaptable to fixed position applications. The species of FIGS. 5 through 7 is more suitable where the tow speeds are lower and more than a single output frequency is desirable.

Figure 8:
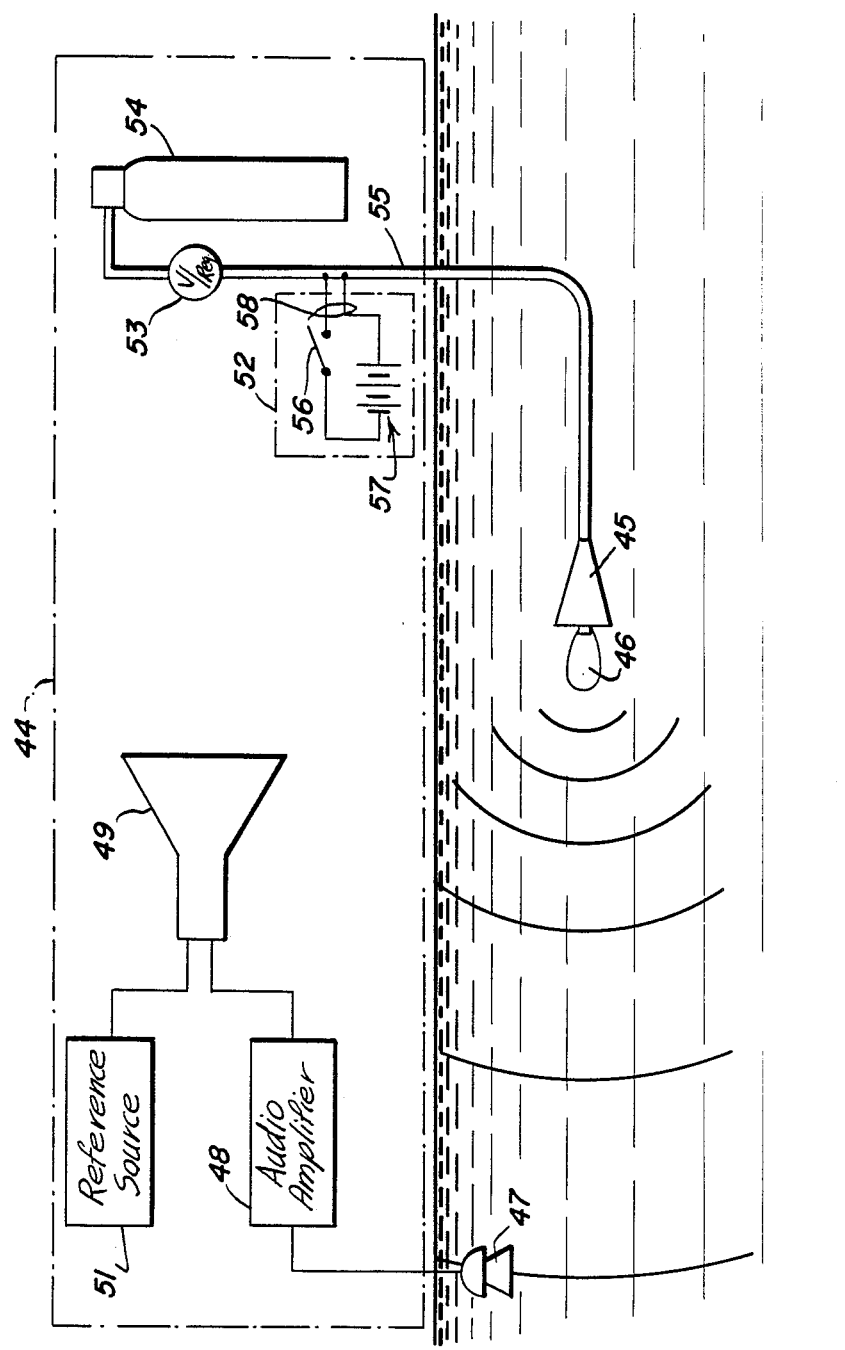
FIG. 8 illustrates, schematically, how the acoustic generators of FIGS. 4 and 5 may be incorporated into a system in which the acoustic output may be varied for obtaining optimum results.

The adjustable form of generator is preferably operated by a control arrangement, such as illustrated in FIG. 8. As shown, a generator 45, of the type of either FIGS. 4 or 5, is towed submerged in a body of water to produce, via resonant bubble 46, an acoustical signal. The acoustic signal impinges a hydrophone 47, generally carried by the towing tractor vehicle, shown as broken line box 44. The output of the hydrophone 47 is amplified by suitable audio amplification equipment 48 and displayed on a suitable indicator 49. Indicator 49 is shown as a cathode ray display device but may be any suitable indicator, if a cathode ray display is not desired. As advantage of a cathode ray tube display is that it may, without undue complication, be used to additionally display a reference signal from a reference source, shown diagrammatically as block 51. Reference source 51 may be, for example, a magnetic recorder with a recorded signal corresponding to the acoustic "signature" of a vessel for which a sweep is to be provided. The display of both the reference signal and the hydrophone signal permits the cathode ray tube to function as a comparison device. By suitable adjustment of the controls 52 and 53, an experienced operator can make the acoustic generator 45 produce an acoustic signal which will closely match the output of the signal from the reference source 51. Control 53 is a pressure reduction valve in the gas conduit 55 between a compressed gas source 54 and the acoustic generator 45. Control 52 includes a switch 56 and an electrical power source 57 connected by wires 58 to the conduit carried conductors, and serves to operate the electrically operated valve, such as shown at 33 in FIG. 6, which controls the motor, in the generator 45, which regulates the water flow.

If the acoustic generator of FIG. 4 were employed, control 52 would be arranged to control the flow of the water or other fluid through the large conduit 18. Such a control could be effective to regulate the output of the pump moving the water or other fluid. If desired, the control 52 could be a valve arranged to restrict the aforesaid fluid flow.

While the above disclosed device has been disclosed as an acoustic generator for use in marine mine countermeasure systems, it should be obvious that it may be employed in other applications without altering the general structure or operation of the device. Such applications may include use as a fishing lure, or as a sonic frequency agitator, but other uses within the scope of the invention will suggest themselves to those proficient in the hydrodynamic and acoustic generator disciplines.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

The invention described herein may be manufactured and used by or for the Government of the United States of America for governmental purposes without the payment of any royalties thereon or therefor.

What is claimed is:

1. A generator for producing an acoustic signal over a predetermined frequency band having a predetermined center frequency in an aqueous medium comprising:
   a body portion shaped so as to produce a cavitation void adjacent one surface of said body portion when exposed to a predetermined fluid velocity across the surface of said body portion;
   a source of gas;
   conduit means joining said source of gas and said body portion; and
   nozzle means mounted on said one surface of said body portion and in commumnication with said source of gas via said conduit means, said nozzle being constructed so as to supply said cavitation void with a predetermined amount of gas sufficient to form a self-oscillating gas bubble resonant over said predetermined frequency band.

2. An acoustic generator according to claim 1 wherein said body portion is conically shaped.

3. An acoustic generator according to claim 1 wherein said body portion is wedge shaped.

4. An acoustic generator according to claim 1 further comprising:
   means operatively connected to said conduit means and selectively actuated to alter the fluid velocity across the surface of said body portion.

5. An acoustic generator according to claim 4 in which the means to selectively alter the fluid velocity is additionally connected to the body portion of said acoustic generator in such a manner that upon actuation the enclosed volume of the said body portion is altered.

6. An acoustic generator according to claim 4 in which the means to selectively alter the fluid velocity is additionally connected to a variable orfice device in such a manner that upon actuation the variable orfice is changed in area to alter the fluid flow which reaches said body portion.

7. An acoustic generator according to claim 1 in which the body is made of a flexible material which is inflated to said shape to produce a cavitation void by gas pressure supplied by said conduit means.

8. An acoustic generator according to claim 4 further comprising:
   a hydrophone positioned to be acoustically coupled to said self-oscillating gas bubble;
   an audio amplifier operatively connected to said hydrophone to be driven thereby; and
   an indicator means connected to the output of said audio amplifier to display a visual indication representing the acoustic output of said self-oscillating gas bubble 9. An acoustic generator according to claim 8 further comprising:

a reference signal source which has an output signal corresponding to a desired acoustic output of the self-oscillating gas bubble, said output signal being connected to said indicator means to provide a visual indication representing said output signal and simultaneously therewith said visual indication representing the acoustic output of said self-oscillating gas bubble.

10. An acoustic generator according to claim 9 further comprising:
means connected to said conduit means selectively for varying the gas pressure in said conduit means.

11. An acoustic generator according to claim 10 further comprising:
circuit means for selectively providing an actuation signal for said means to alter the fluid velocity across the surface of said body portion; and
conductor means carried by said conduit means operatively connecting said circuit means, to said means to alter the fluid velocity.

* * * * *